(12) United States Patent
Wei et al.

(10) Patent No.: US 12,450,873 B2
(45) Date of Patent: Oct. 21, 2025

(54) DATA CLASSIFICATION AND RECOGNITION METHOD AND APPARATUS, DEVICE, AND MEDIUM

(71) Applicant: TENCENT TECHNOLOGY (SHENZHEN) COMPANY LIMITED, Shenzhen (CN)

(72) Inventors: Dong Wei, Shenzhen (CN); Jinghan Sun, Shenzhen (CN); Kai Ma, Shenzhen (CN); Liansheng Wang, Shenzhen (CN); Yefeng Zheng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 222 days.

(21) Appl. No.: 18/077,709

(22) Filed: Dec. 8, 2022

(65) Prior Publication Data

US 2023/0105590 A1 Apr. 6, 2023

Related U.S. Application Data

(63) Continuation of application No. PCT/CN2022/090902, filed on May 5, 2022.

(30) Foreign Application Priority Data

May 17, 2021 (CN) .......................... 202110532246.3

(51) Int. Cl.
*G06V 10/764* (2022.01)
*G06F 18/213* (2023.01)
(Continued)

(52) U.S. Cl.
CPC .......... *G06V 10/764* (2022.01); *G06F 18/213* (2023.01); *G06F 18/241* (2023.01);
(Continued)

(58) Field of Classification Search
CPC ............. G06V 10/764; G06V 10/7715; G06V 10/7753; G06V 10/95; G06V 2201/03;
(Continued)

(56) References Cited

U.S. PATENT DOCUMENTS

2020/0110596 A1 4/2020 Niininen et al.
2021/0065054 A1* 3/2021 Nie ......................... G06N 3/045

FOREIGN PATENT DOCUMENTS

| CN | 111522958 A | 8/2020 |
| CN | 112184508 A | 1/2021 |

(Continued)

OTHER PUBLICATIONS

Taymouri et al., Predictive Business Process Monitoring via Generative Adversarial Nets: The Case of Next Event Prediction, Sep. 4, 2020 [retrieved Dec. 6, 2024], International Conference on Business Process Management, vol. 12168, pp. 237-256. https://doi.org/10.1007/978-3-030-58666-9_14 (Year: 2020).*

(Continued)

*Primary Examiner* — Henok Shiferaw
*Assistant Examiner* — Dennis Rosario
(74) *Attorney, Agent, or Firm* — Anova Law Group, PLLC

(57) ABSTRACT

A data classification and recognition method includes: obtaining a first data set and a second data set, the second data set including second data, samples in the second data being labeled; performing training using first data in an unsupervised training mode and using the second data in a supervised training mode to obtain a first classification model; obtaining a second classification model; performing distillation training on a model parameter of the second classification model to obtain a data classification model; and performing class prediction on target data by using the data classification model.

18 Claims, 7 Drawing Sheets

(51) Int. Cl.
| | |
|---|---|
| *G06F 18/241* | (2023.01) |
| *G06F 18/25* | (2023.01) |
| *G06N 3/088* | (2023.01) |
| *G06N 3/0895* | (2023.01) |
| *G06N 3/09* | (2023.01) |
| *G06N 20/00* | (2019.01) |
| *G06N 20/20* | (2019.01) |
| *G06V 10/40* | (2022.01) |
| *G06V 10/70* | (2022.01) |
| *G06V 10/77* | (2022.01) |
| *G06V 10/774* | (2022.01) |
| *G06V 10/80* | (2022.01) |
| *G06V 10/94* | (2022.01) |
| *G06V 30/18* | (2022.01) |
| *G06V 30/19* | (2022.01) |
| *A61B 5/00* | (2006.01) |
| *G06F 18/21* | (2023.01) |
| *G06F 18/214* | (2023.01) |
| *G06T 5/60* | (2024.01) |
| *G06V 10/778* | (2022.01) |
| *G10L 15/02* | (2006.01) |
| *G10L 15/06* | (2013.01) |
| *G10L 15/16* | (2006.01) |
| *G10L 25/30* | (2013.01) |

(52) U.S. Cl.
CPC ............ *G06F 18/25* (2023.01); *G06N 3/088* (2013.01); *G06N 3/0895* (2023.01); *G06N 3/09* (2023.01); *G06N 20/00* (2019.01); *G06N 20/20* (2019.01); *G06V 10/40* (2022.01); *G06V 10/70* (2022.01); *G06V 10/7715* (2022.01); *G06V 10/7753* (2022.01); *G06V 10/803* (2022.01); *G06V 10/806* (2022.01); *G06V 10/809* (2022.01); *G06V 10/95* (2022.01); *G06V 30/18* (2022.01); *G06V 30/19173* (2022.01); *A61B 5/7264* (2013.01); *A61B 5/7267* (2013.01); *G06F 18/2155* (2023.01); *G06F 18/2178* (2023.01); *G06T 5/60* (2024.01); *G06T 2207/20081* (2013.01); *G06V 10/7784* (2022.01); *G06V 10/7788* (2022.01); *G10L 15/02* (2013.01); *G10L 15/063* (2013.01); *G10L 15/16* (2013.01); *G10L 25/30* (2013.01)

(58) Field of Classification Search
CPC ...... G06V 10/774; G06V 10/80; G06V 10/82; G06V 10/7784; G06V 10/7788; G06V 10/7792; G06V 10/70; G06V 10/454; G06V 40/172; G06V 10/40; G06V 20/698; G06V 20/70; G06V 30/19173; G06V 40/197; G06V 10/809; G06V 10/811; G06V 10/806; G06V 10/803; G06V 30/18; G06V 40/168; G06V 30/18057; G06F 18/241; G06F 18/25; G06F 18/214; G06F 18/41; G06F 18/2178; G06F 18/2185; G06F 18/217; G06F 18/24; G06F 18/251; G06F 18/253; G06F 18/254; G06F 18/256; G06F 18/21; G06F 18/213; G06F 18/2155; G06N 20/00; G06N 3/045; G06N 3/0455; G06N 3/02; G06N 3/08; G06N 20/20; G06N 3/09; G06N 3/0464; G06N 3/0895; G06N 3/088; G06T 2207/20081; G06T 2207/20084; G06T 7/73; G06T 7/246; G06T 5/60; G06T 3/4046; G06T 7/33; A61B 5/7267; A61B 5/7264; G16B 40/20; G16B 40/30; G10L 15/063; G10L 25/30; G10L 15/16; G10L 15/02; H04N 21/4666
See application file for complete search history.

(56) References Cited

FOREIGN PATENT DOCUMENTS

| | | | |
|---|---|---|---|
| CN | 112347261 A | | 2/2021 |
| CN | 112447173 A | * | 3/2021 |
| CN | 112686046 A | | 4/2021 |
| CN | 112949786 A | | 6/2021 |

OTHER PUBLICATIONS

Cornia et al., Meshed-Memory Transformer for Image Captioning, Mar. 20, 2020 [retrieved Dec. 6, 2024], Cornell University:arXiv, version [v2], 15 pages. https://doi.org/10.48550/arXiv.1912.08226 (Year: 2020).*

Liu et al., S-CUDA: Self-cleansing unsupervised domain adaptation for medical image segmentation, Dec. 2021 [retrieved Dec. 6, 2024], Medical Image Analysis, vol. 74, 13 pages. https://doi.org/10.1016/j.media.2021.102214 (Year: 2021).*

Sun et al., Unsupervised Representation Learning Meets Pseudo-Label Supervised Self-Distillation: A New Approach to Rare Disease Classification, Sep. 21, 2021 [retrieved Dec. 6, 2024], Medical Image Computing and Computer Assisted Intervention 2021, pp. 519-529. (Year: 2021) https://doi.org/10.1007/978-3-030-87240-3_50 (Year: 2021).*

Chen et al., An Effective Tumor Classification With Deep Forest and Self-Training, Jul. 12, 2021 [retrieved Dec. 6, 2024], IEEE Access, vol. 9, pp. 100944-100950. DOI: 10.1109/ACCESS.2021.3096241 (Year: 2021).*

Mondol et al., AFExNet: An Adversarial Autoencoder for Differentiating Breast Cancer Sub-Types and Extracting Biologically Relevant Genes, Mar. 15, 2021 (very first instance of public dissemination): current version Aug. 8, 2022, [retrieved Dec. 6, 2024], (Year: 2021) IEEE/ACM Transactions on Computational Biology and Bioinformatics, vol. 19, Issue: 4, pp. 2060-2070. https://doi.org/10.1109/TCBB.2021.3066086 (Year: 2021).*

Search machine translation of CN-112447173-A to Li et al., Voice Interactive Method, Device and Computer Storage Medium, translated Dec. 6, 2024, 24 pages. (Year: 2024).*

He et al., Momentum Contrast for Unsupervised Visual Representation Learning, Mar. 23, 2020 [retrieved Mar. 18, 2025], Cornell University: arXiv, version: [v3], 12 pages. https://doi.org/10.48550/arXiv.1911.05722 (Year: 2020).*

Caron et al., Deep Clustering for Unsupervised Learning of Visual Features, Mar. 18, 2019 [retrieved Mar. 18, 2025], Cornell University: arXiv, version: [v2], 30 pages. https://doi.org/10.48550/arXiv.1807.05520 (Year: 2019).*

Li et al., Pseudo-Labeling Optimization Based Ensemble Semi-Supervised Soft Sensor in the Process Industry, Dec. 19, 2021 [retrieved Jun. 27, 2025], Sensors, vol. 21, Issue 24, 31 pages. https://doi.org/10.3390/s21248471 (Year: 2021).*

Nam et al., Zero-shot Natural Language Video Localization, Aug. 29, 2021 [retrieved Jun. 27, 2025], Cornell University:arXiv, version [v1], 10 pages. https://doi.org/10.48550/arXiv.2110.00428 (Year: 2021).*

The World Intellectual Property Organization (WIPO) International Search Report for PCT/CN2022/090902 Jul. 15, 2022 6 Pages (including translation).

Li, Xiaomeng, et al. "Difficulty-aware meta-learning for rare disease diagnosis." Medical Image Computing and Computer Assisted Intervention-MICCAI 2020: 23rd International Conference, Lima, Peru, Oct. 4-8, 2020, Proceedings, Part I 23. Springer International Publishing, 2020.

Khodadadeh, Siavash, Ladislau Boloni, and Mubarak Shah. "Unsupervised meta-learning for few-shot image classification." Advances in neural information processing systems 32 (2019).

(56) References Cited

OTHER PUBLICATIONS

Tian, Yonglong, et al. "Rethinking few-shot image classification: a good embedding is all you need ?. " Computer Vision-ECCV 2020: 16th European Conference, Glasgow, UK, Aug. 23-28, 2020, Proceedings, Part XIV 16. Springer International Publishing, 2020.

He, K., Fan, H., Wu, Y., Xie, S., Girshick, R.: Momentum contrast for unsupervised visual representation learning. In: Proceedings of the IEEE/CVF Conference on Computer Vision and Pattern Recognition. pp. 9729-9738 (2020).

Oord, A.v.d., Li, Y., Vinyals, O.: Representation learning with contrastive predictive coding. arXiv preprint arXiv: 1807.03748 (2018).

Furlanello T, Lipton Z, Tschannen M, Itti L, Anandkumar A. Born again neural networks. InInternational conference on machine learning Jul. 3, 2018 (pp. 1607-1616). PMLR.

Kim, K., Ji, B., Yoon, D., Hwang, S.: Self-knowledge distillation: A simple way for better generalization. arXiv preprint arXiv:2006.12000 (2020).

Codella, N., Rotemberg, V., Tschandl, P., Celebi, M.E., Dusza, S., Gutman, D., Helba, B., Kalloo, A., Liopyris, K., Marchetti, M., et al.: Skin Lesion Analysis Toward Melanoma Detection 2018: A Challenge hosted by the International Skin Imaging Collaboration (ISIC). arXiv preprint arXiv: 1902.03368 (2019).

Tschandl, P., Rosendahl, C., Kittler, H.: The HAM10000 dataset, a large collection of multi-source dermatoscopic images of common pigmented skin lesions. Scientific Data 5(1), 1-9 (2018).

Finn, C., Abbeel, P., Levine, S.: Model-agnostic meta-learning for fast adaptation of deep networks. In: International Conference on Machine Learning. pp. 1126-1135. PMLR (2017).

Sung, F., Yang, Y., Zhang, L., Xiang, T., Torr, P.H., Hospedales, T.M.: Learning to compare: Relation network for few- shot learning. In: Proceedings of the IEEE Conference on Computer Vision and Pattern Recognition (Jun. 2018).

Snell, J., Swersky, K., Zemel, R.: Prototypical networks for few-shot learning. In: Advances in Neural Information Processing Systems. pp. 4080-4090 (2017).

Hsu, K., Levine, S., Finn, C.: Unsupervised learning via meta-learning. In: International Conference on Learning Representations (2018).

Huang, L., Zhang, C., Zhang, H.: Self-adaptive training: Beyond empirical risk minimization. arXiv preprint arXiv:2002.10319 (2020).

Chen, T., Kornblith, S., Norouzi, M., Hinton, G.: A simple framework for contrastive learning of visual representations. In: International Conference on Machine Learning. pp. 1597-1607. PMLR (2020).

Chen, X., Fan, H., Girshick, R., He, K.: Improved baselines with momentum contrastive learning. arXiv preprint arXiv:2003.04297 (2020).

\* cited by examiner

DATA CLASSIFICATION AND RECOGNITION METHOD AND APPARATUS, DEVICE, AND MEDIUM

CROSS-REFERENCES TO RELATED APPLICATIONS

This application is a continuation application of PCT Patent Application No. PCT/CN2022/090902, filed on May 5, 2022, which claims priority to Chinese Patent Application No. 202110532246.3, entitled "DATA CLASSIFICATION AND RECOGNITION METHOD AND APPARATUS, DEVICE, AND READABLE STORAGE MEDIUM" and filed with the National Intellectual Property Administration, PRC on May 17, 2021, the entire contents of both of which are incorporated herein by reference.

FIELD OF THE TECHNOLOGY

Embodiments of the present disclosure relate to the field of machine learning, and in particular to a data classification and recognition method and apparatus, a device, a medium, and a program product.

BACKGROUND OF THE DISCLOSURE

The diagnosis of diseases based on medical images usually includes the diagnosis of rare diseases and the diagnosis of common diseases. That is, a medical image is inputted into a machine learning model. The machine learning model analyzes the medical image to determine a physical abnormality corresponding to the medical image.

In the related art, during the diagnosis of rare diseases, a medical image is inputted into a classification model for rare diseases. The classification model analyzes and diagnoses the medical image to determine to which rare disease an image feature expressed in the medical image belongs. The classification model requires a large number of image data sets labeled with rare disease information to ensure the accuracy of the model in a training process.

However, rare diseases are conditions with low occurrence rates, and it is difficult to collect image data of rare diseases and to label information of rare diseases, leading to low training efficiency of the classification model and low classification accuracy of the classification model.

SUMMARY

Embodiments of the present disclosure provide a data classification and recognition method and apparatus, a device, a medium, and a program product, which can improve the training efficiency of a classification model for recognizing and classifying rare diseases. The technical solutions are as follows:

According to an aspect, a data classification and recognition method is provided, applied to a computer device, the method including: obtaining a first data set and a second data set, the first data set including first data, the second data set including second data, where samples in the second data are labeled; training a candidate classification model using the first data in an unsupervised training mode and using the second data in a supervised training mode to obtain a first classification model; obtaining a second classification model, the second classification model being a classification model with a model parameter to be adjusted; adjusting the model parameter of the second classification model by using a first prediction result of the first data by the first classification model as a reference and based on a second prediction result of the first data by the second classification model to obtain a data classification model; and performing class prediction on target data by using the data classification model to obtain a classification result of the target data.

According to another aspect, a data classification and recognition apparatus is provided, the apparatus including: an obtaining module, configured to obtain a first data set and a second data set, the first data set including first data, the second data set including second data, where samples in the second data are labeled; and a training module, configured to train a candidate classification model using the first data in an unsupervised training mode and using the second data in a supervised training mode to obtain a first classification model, the obtaining module being further configured to obtain a second classification model, the second classification model being a classification model with a model parameter to be adjusted; the training module being further configured to adjust the model parameter of the second classification model by using a first prediction result of the first data by the first classification model as a reference and based on a second prediction result of the first data by the second classification model to obtain a data classification model; and a prediction module, configured to perform class prediction on target data by using the data classification model to obtain a classification result of the target data.

According to another aspect, a computer device is provided, including a processor and a memory, the memory storing at least one instruction, at least one program, a code set, or an instruction set, the at least one instruction, the at least one program, the code set, or the instruction set being loaded and executed by the processor to implement any data classification and recognition method in the foregoing embodiments of the present disclosure.

According to another aspect, a non-transitory computer-readable storage medium is provided, storing at least one instruction, at least one program, a code set or an instruction set, and the at least one instruction, the at least one program, the code set or the instruction set being loaded and executed by a processor to implement any data classification and recognition method in the foregoing embodiments of the present disclosure.

The beneficial effects of the technical solutions provided in the embodiments of the present disclosure at least include:

A first classification model is obtained after unsupervised training using unlabeled first data and supervised training of labeled second data, so that based on the first classification model, a second classification model is created based on the first classification model to perform knowledge distillation training, and supervised training is performed by using a teacher model to implement distillation, to eventually obtain a student model with higher performance and precision. The training mainly depends on a large amount of first data and requires a small amount of labeled second data, to avoid a complex process of massive labeling of sample data, thereby improving the training efficiency and accuracy of a data classification model.

DESCRIPTION OF EMBODIMENTS

First, terms involved in the embodiments of the present disclosure are briefly introduced.

A pseudo-label is label for labeling data based on a prediction result that is obtained after prediction is performed on unlabeled data by using a trained model. That is, the pseudo-label is not a label manually labeled according to an actual condition of data, but is a label that is labeled by a trained model and has a certain fault tolerance rate. In some embodiments, a class prediction result obtained after a trained classification model performs class prediction on data is a pseudo-label corresponding to the data.

A classification model for rare diseases is required for the diagnosis of rare diseases in the related art. The training of the classification model requires a large amount of sample image data labeled with rare disease information. The sample image data is classified and recognized by using the classification model to obtain a recognition result. The classification model is trained by using a difference between the labeled rare disease information and the recognition result. However, due to the rareness of rare diseases, it is difficult to obtain the sample image data, it requires a lot of manpower to acquire the sample image data and label the sample image data with rare disease information, resulting in low training efficiency of the classification model. The great difficulty of obtaining sample image data of rare diseases leads to insufficient training sample data, and the trained classification model has low accuracy.

In the embodiments of the present disclosure, a data classification and recognition method is provided, so that the training efficiency and accuracy of a data classification model are improved when there are a small number of samples labeled with labels.

Figure 1:
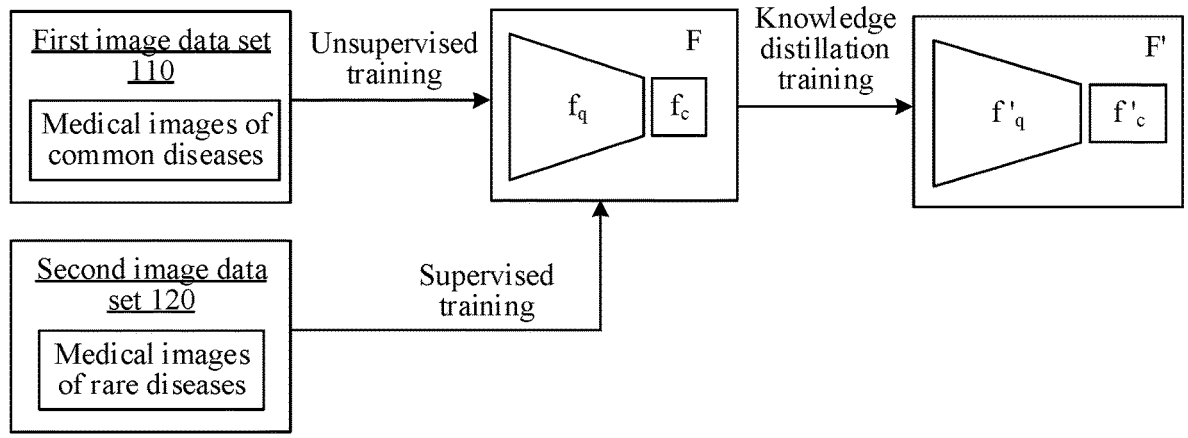
FIG. 1 is a schematic diagram of an implementation procedure of an overall scheme according to an exemplary embodiment of the present disclosure.

Schematically, FIG. 1 is a schematic diagram of an implementation procedure of an overall scheme according to an exemplary embodiment of the present disclosure. A process of training a rare disease classification model is used as an example, as shown in FIG. 1.

A first image data set 110 and a second image data set 120 are first obtained. The first image data set 110 includes medical images of common diseases, and label information is not used or label information is not labeled in the medical images in the first image data set 110. The second image data set 120 includes medical images of a few rare diseases, and the medical images in the second image data set 120 include labeled label information. The label information is used for representing rare disease information corresponding to the medical images.

After unsupervised training is performed on a feature extraction network $f_q$ by using the first image data set 110, $f_q$ after unsupervised training is connected to a classification network $f_c$ to obtain a first classification model F. Supervised training is performed on the first classification model F by using the second image data set 120, and knowledge distillation training is performed on a second classification model F' based on the trained first classification model F, to obtain a rare disease classification model (that is, the trained second classification model F').

The knowledge distillation training is guiding a classification capability of an untrained model based on a classification capability of a trained model. In this embodiment, in a process of implementing knowledge distillation training, a prediction result of data by the first classification model F is mainly used as a reference for guiding a prediction capability of data by the second classification model F'. That is, after data a is inputted into the first classification model F, a pseudo-label obtained through prediction by the first classification model F is outputted. After the data a is inputted into the second classification model F', a classification result obtained through prediction by the second classification model F' is outputted. The second classification model F' is trained by using a difference between the classification result and the pseudo-label, to guide the classification accuracy of the second classification model F' to approach that of the first classification model F.

Figure 2:
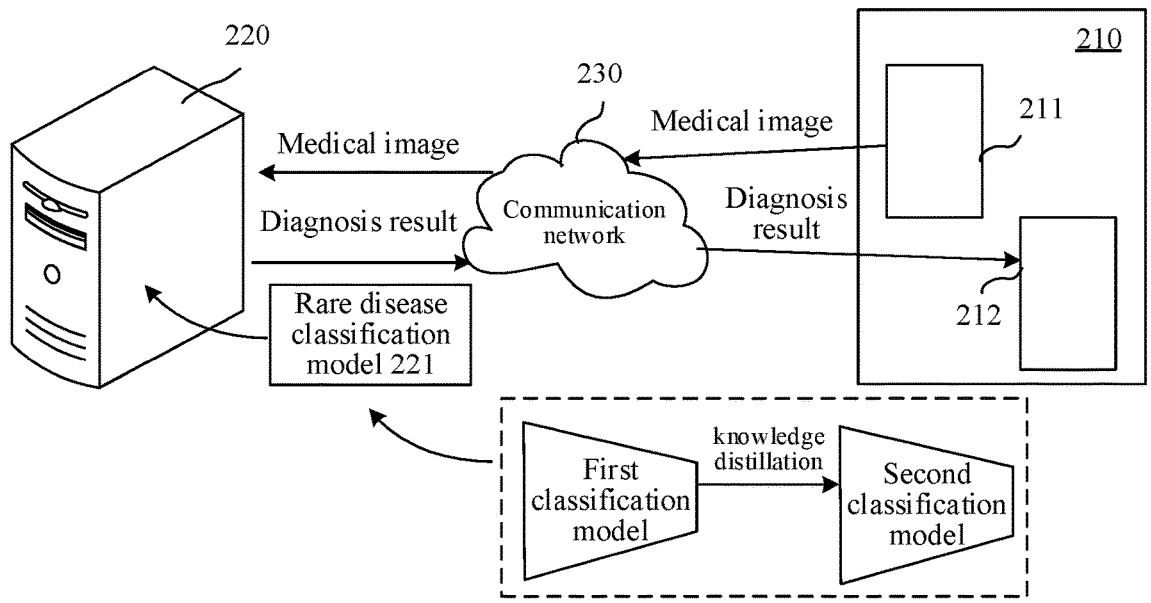
FIG. 2 is a schematic diagram of an implementation environment according to an exemplary embodiment of the present disclosure.

Next, the implementation environment in the embodiments of the present disclosure is described. Schematically, referring to FIG. 2, the implementation environment includes a terminal 210 and a server 220. The terminal 210 and the server 220 are connected by a communication network 230.

In some embodiments, the terminal 210 includes a first terminal 211 and a second terminal 212.

The first terminal 211 is configured to send a medical image to the server 220. Schematically, the first terminal 211 is a terminal used by a doctor. The doctor uses a classification model for assisted diagnosis in a process of diagnosing a rare disease by using medical images, thereby improving the diagnosis accuracy. Alternatively, the first terminal 211 is a terminal used by a user such as a patient or a relative of a patient. The user sends a medical image to a server to obtain a reference diagnosis result. Alternatively, the first terminal 211 is a terminal connected to a medical image scanning device. The medical image scanning device performs a scan to obtain a medical image and transmit the medical image to the first terminal 211. After receiving the medical image, the first terminal 211 forwards the medical image to the server 220 for assisted diagnosis.

The server 220 trains a rare disease classification model 221 in the foregoing manner shown in FIG. 1, obtains the rare disease classification model 221, receives a medical image uploaded by the first terminal 211, and performs classification and recognition on the medical image by using the rare disease classification model 221 to obtain a classification and diagnosis result of the medical image in a rare disease class set. The server 220 feeds back the classification and diagnosis result to the first terminal 211 or the classification and diagnosis result to the second terminal 212.

When the first terminal 211 is implemented as a terminal connected to the medical image scanning device, the server 220 sends the classification and diagnosis result to the second terminal 212. The second terminal 212 is implemented as a terminal used by a doctor or a terminal used by a user.

The foregoing terminal may be various forms of terminal devices such as a mobile phone, a tablet computer, a desktop computer, and a portable notebook computer. This is not limited in the embodiments of the present disclosure.

The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

The cloud technology is a hosting technology that unifies a series of resources such as hardware, software, and networks in a wide area network or a local area network to implement computing, storage, processing, and sharing of data.

In some embodiments, the foregoing server may be implemented as a node in a blockchain system.

Information (including, but not limited to, device information of a user, and personal information of a user), data (including, but not limited to, data for analysis, stored data, and displayed data), and signals in the present disclosure are all independently authorized by a user or fully authorized by all parties, and the collection, use and processing of relevant data need to comply with the relevant laws, regulations, and standards of the relevant countries and regions. For example, medical images in the present disclosure are all obtained with full authorization.

In addition, medical images in the present disclosure are acquired with sufficient indication of the purpose of acquiring the medical images and the authorization from the owner of the images when the authorization is obtained.

An application scenario in this embodiment of the present disclosure is described by using an example with reference to the foregoing brief introduction of nouns.

First, in a scenario, a doctor uses a classification model for assisted diagnosis.

That is, a doctor sends a medical image to a server with a terminal. The server performs classification and recognition on the medical image by using a trained classification model to obtain a classification and diagnosis result corresponding to the medical image, and feeds back the classification and diagnosis result to the terminal used by the doctor for display, so that the user performs assisted diagnosis by using the classification and diagnosis result and obtains a final diagnosis result.

Second, a user uses a classification model for prediagnosis.

A user (a patient or a relative of a patient) sends a medical image to a server. The server performs classification and recognition on the medical image by using a trained classification model to obtain a classification and diagnosis result corresponding to the medical image, and feeds back the classification and diagnosis result to a terminal used by the user for display. The user first initially learns about an abnormal physical state according to the classification and diagnosis result, and then obtains a detailed diagnosis result through the diagnosis by a doctor.

Third, a classification model may be applied to other classification scenarios.

Schematically, the classification model may be applied to an object recognition scenario, a speech recognition scenario, a handwriting recognition scenario, and the like. This is not limited in the embodiments of the present disclosure.

Figure 3:
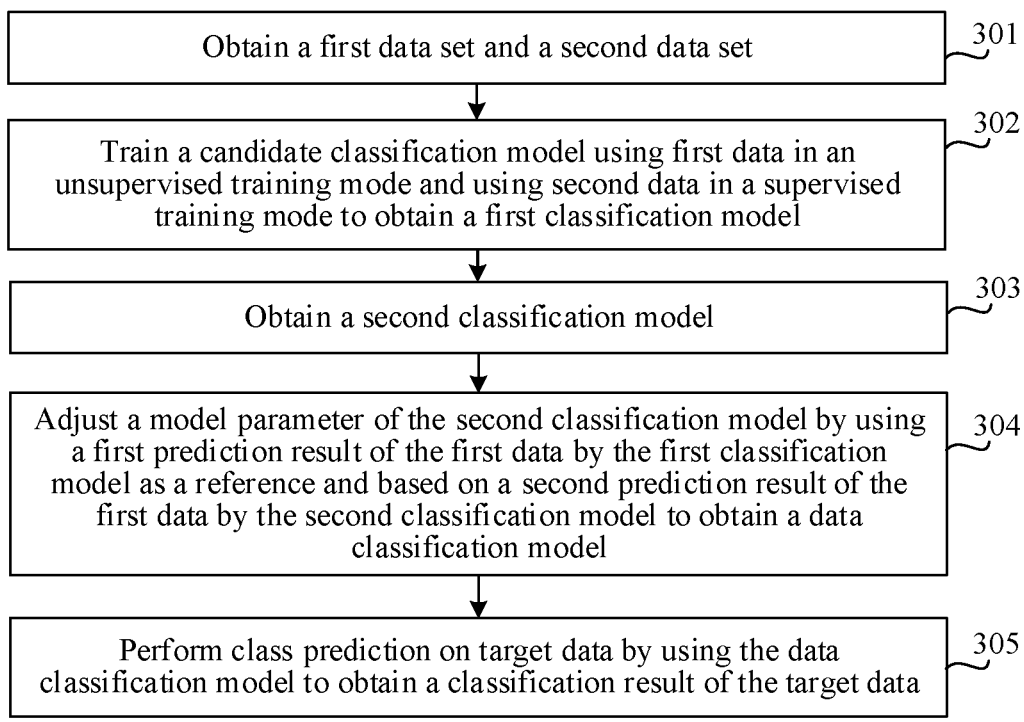
FIG. 3 is a flowchart of a data classification and recognition method according to an exemplary embodiment of the present disclosure.

The data classification and recognition method provided in the present disclosure is described with reference to the foregoing brief introduction of nouns and application scenarios. For example, the method is applied to a server. As shown in FIG. 3, the method includes the following steps:

Step 301: Obtain a first data set and a second data set.

The first data set includes first data. The second data set includes second data labeled with a sample label.

In some embodiments, the first data in the first data set is data not labeled with a label, and the second data in the second data set is data labeled with a sample label. Alternatively, the first data in the first data set is labeled with a label, but the label labeled in the first data is not used in this embodiment.

In some embodiments, the first data belongs to a first class set, and the second data belongs to a target class set. That is, the first data and the second data are data that corresponds to different class sets. A class set is used for representing a set including a plurality of subordinate classes. That is, the class set is the concept of superior generalization of classes. The superior generalization includes subordinate classes characteristics that belong to the generalization. Schematically, the concept of first-level generalization is diseases, and the concept belonging to diseases includes two subordinate classes: common diseases and rare diseases. The first class set is correspondingly a common disease class set. Eye diseases are used as an example. For example, the first class set includes common eye disease types such as myopia, hyperopia, and conjunctivitis. The target class set is correspondingly a rare disease class set. Eye diseases are used as an example. For example, the target class set includes rare eye disease types such as xerophthalmia, visual snow, and hereditary optic neuropathy.

In the embodiments of the present disclosure, the common diseases and rare diseases are diseases corresponding to the same organ or the same body part. Alternatively, the common diseases and rare diseases belong to the same disease type such as a physical pain type or a vomiting type.

In some embodiments, the first data included in the first data set is medical images corresponding to common diseases, for example, a Computed Tomography (CT) image, an X-ray image, an ultrasonic image, and images in other forms. The second data included in the second data set is medical images corresponding to rare diseases, for example, a CT image, an X-ray image, an ultrasonic image, and images in other forms.

The foregoing medical images are only schematic examples. The first data and the second data in the embodiments of the present disclosure may be implemented as data of other types such as speech data and text data. This is not limited in the embodiments of the present disclosure.

In some embodiments, a data amount (that is, a quantity of medical images) of the first data in the first data set is greater than a data amount (that is, a quantity of medical images) of the second data in the second data set. In some embodiments, an amount of the second data in the second data set is within a required amount range, for example, is less than a preset amount.

In some embodiments, the first data in the first data set is data randomly sampled from a basic data set. The basic data set includes common disease data. The second data in the second data set is data randomly sampled from a rare disease data set. The rare disease data set includes rare disease data.

The second data is labeled with rare disease information, that is, a rare disease type corresponding to each medical image.

Step 302: Train a candidate classification model using first data in an unsupervised training mode and using second data in a supervised training mode to obtain a first classification model.

In some embodiments, unsupervised training is performed on a feature extraction network in a candidate classification model based on first data. A classification regression network in the candidate classification model and the feature extraction network after unsupervised training are combined to obtain a base classification model. The classification regression network is configured to perform data classification. In some embodiments, the classification regression network is configured to perform data classification in the target class set (that is, a class set to which the second data belongs). Supervised training is performed on the base classification model by using second data and a sample label in the second data set to obtain a first classification model.

The first data in the first data set is data without a correspondingly labeled label. Therefore, the first data can only be used for performing unsupervised training on the feature extraction network. The second data in the second data set has a correspondingly labeled sample label. Therefore, the second data can only be used for performing supervised training on the base classification model.

Step 303: Obtain a second classification model.

The second classification model is a classification model with a model parameter to be adjusted.

In some embodiments, the second classification model is a randomly initialized classification model. The second classification model includes a model parameter. The second classification model is configured to perform distillation training according to knowledge outputted by the first classification model. Knowledge distillation refers to a process in which supervision information outputted by a teacher model is used as knowledge and a student model learns the supervision information transferred from the teacher model. Supervised training is performed by using the teacher model to implement distillation, to eventually obtain a student model with higher performance and precision.

Step 304: Adjust a model parameter of the second classification model by using a first prediction result of the first data by the first classification model as a reference and based on a second prediction result of the first data by the second classification model to obtain a data classification model.

In some embodiments, class prediction is performed on the first data by using the first classification model to obtain a first prediction result. In some embodiments, the first prediction result is used as a class pseudo-label corresponding to the first data in the target class set. Class prediction is performed on the first data by using the second classification model to obtain the second prediction result. A model parameter of the second classification model is adjusted based on a difference between the first prediction result and the second prediction result to obtain a data classification model. The first classification model and the second classification model perform prediction on the same first data to obtain the first prediction result outputted by the first classification model and the second prediction result outputted by the second classification model. Schematically, the first data set includes data A, data B, and data C. First, the first classification model performs prediction on the data A to obtain a first prediction result a. The second classification model performs prediction on the data a to obtain a second prediction result b. The model parameter of the second classification model is adjusted according to a difference between the first prediction result a and the second prediction result b.

That is, a pseudo-label outputted after the first classification model performs class prediction on the first data is used as knowledge, and the second classification model transfers the pseudo-label for distillation, thereby implementing knowledge distillation training of the second classification model. The second classification model transferring the pseudo-label for distillation refers to that after performing class prediction on the first data, the second classification model uses the pseudo-label as a reference to estimate a prediction result, thereby adjusting the model parameter. That is, the pseudo-label obtained through recognition by the first classification model is used as a data label to guide a class prediction result of the second classification model to approach the pseudo-label, thereby improving the class prediction accuracy of the second classification model.

Step 305: Perform class prediction on target data by using the data classification model to obtain a classification result of the target data.

In some embodiments, class prediction is performed on target data by using the data classification model to obtain a classification result of the target data in a target class set. The target class set is a class set to which second data labeled with a sample label belongs.

The data classification model is obtained after the second classification model is trained, and target data is classified by using the data classification model to obtain a classification result of the target data in the target class set. The target data may be data during actual application, for example, medical images during actual application. Alternatively, the target data may be data that is in a test set and is used for testing the data classification model.

In summary, in the data classification and recognition method provided in this embodiment, a first classification model is obtained after unsupervised training using unlabeled first data and supervised training of labeled second data, so that a second classification model is created based on the first classification model to perform knowledge distillation training, and supervised training is performed by using a teacher model to implement distillation, to eventually obtain a student model with higher performance and precision. The training mainly depends on a large amount of first data and requires a small amount of labeled second data, to avoid a complex process of massive labeling of sample data, thereby improving the training efficiency and accuracy of a data classification model.

Figure 4:
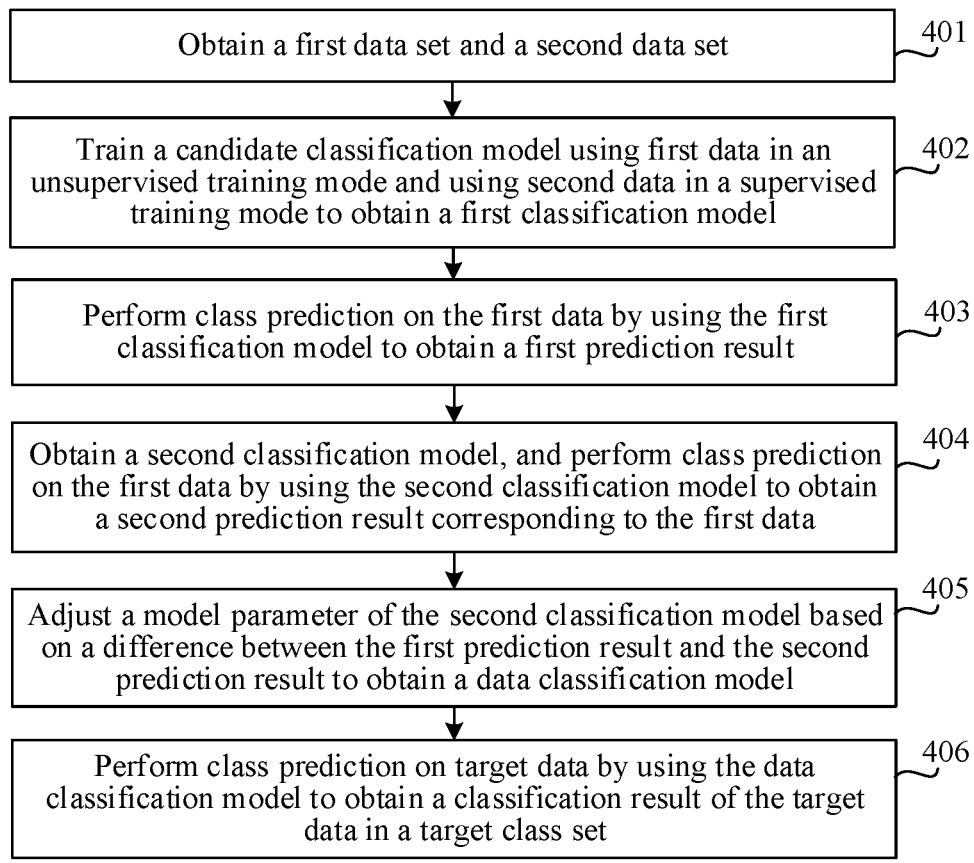
FIG. 4 is a flowchart of a data classification and recognition method according to another exemplary embodiment of the present disclosure.

In some embodiments, in a process of performing distillation training on the second classification model by using the first classification model, a pseudo-label obtained through recognition by the first classification model needs to be used as knowledge. FIG. 4 is a flowchart of a data classification and recognition method according to another exemplary embodiment of the present disclosure. An example in which the method is applied to a server is used for description. As shown in FIG. 4, the method includes the following steps:

Step 401: Obtain a first data set and a second data set.

The first data set includes first data. The second data set includes second data labeled with a sample label.

In some embodiments, the first data in the first data set is data not labeled with a label, and the second data in the second data set is data labeled with a sample label.

In some embodiments, the first data belongs to a first class set, and the second data belongs to a target class set. That is, the first data and the second data are data that corresponds to different class sets. Schematically, the first class set is correspondingly a common disease class set, and the target class set is correspondingly a rare disease class set.

Step 402: Train a candidate classification model using first data in an unsupervised training mode and using second data in a supervised training mode to obtain a first classification model.

In some embodiments, unsupervised training is performed on a feature extraction network in a candidate classification model based on first data in the first data set. A classification regression network in the candidate classification model and the feature extraction network after unsupervised training are combined to obtain a base classification model. The classification regression network is configured to perform data classification in the target class set. Supervised training is performed on the base classification model by using second data and a sample label in the second data set to obtain a first classification model.

The first classification model has a high classification performance. However, in a process of representation learning, knowledge related to the target class set is ignored. Therefore, in the embodiments of the present disclosure, the first classification model is used as a reference model, and distillation training is performed on the second classification model by using knowledge outputted by the first classification model. The second classification model is a classification model that has a model parameter to be adjusted and is configured to perform classification in the target class set.

Step 403: Perform class prediction on the first data by using the first classification model to obtain a first prediction result.

Even if the first data set and the second data set include data of different types, the data has similar features. Schematically, the first data set is medical images of common diseases, and the second data set is medical images of rare diseases. Therefore, the data in the first data set and the data in the second data set have similar features in color, texture or shape. Therefore, a probability that an image in the first data set belongs to a class in the target class set is predicted by using the first classification model as a reference model.

In some embodiments, class prediction is performed on the first data in the first data set by using the first classification model to obtain a probability value that the first data corresponds to a class in a target class set, and A pseudo-label corresponding to the first data is determined from the target class set based on the probability value as the first prediction result.

In some embodiments, a soft label that the first data corresponds to a class in the target class set, that is, a probability that the first data corresponds to a class in the target class set, is first determined by using the first classification model: $p=F(x)=[p_1, \ldots, p_n]^T$, where p represents a probability, n represents a quantity of classes in the target class set, $F(x)$ represents performing class prediction on first data x by using a first classification model F, and a sum of probabilities of the n types is 1. A hard label that the first data corresponds to a class in the target class set is further determined according to the foregoing determined soft label. Schematically, according to the foregoing probability p, a class with the largest probability is labeled as a pseudo-label corresponding to the first data. That is, a hard label of the class with the largest probability is 1, and a hard label of another type is 0. The class with the hard label being 1 is a first prediction result corresponding to the first data. That is, a pseudo-label corresponding to the first data. That is, class prediction is performed on one piece of first data x to obtain one first prediction result. That is, class prediction is performed on m pieces of first data to obtain m first prediction results, where m is a positive integer. One first prediction result can be obtained through class prediction for each piece of first data.

Step 404: Obtain a second classification model, and perform class prediction on the first data by using the second classification model to obtain a second prediction result corresponding to the first data.

The second classification model is a model with a model parameter to be adjusted. The second classification model is configured to perform classification on data in the corresponding target class set.

After the first classification model and the second classification model perform class prediction on one same piece of first data to respectively obtaining the first prediction result and the second prediction result, a comparison significance exists between the first prediction result and the second prediction result corresponding to the same piece of first data.

Step 405: Adjust a model parameter of the second classification model based on a difference between the first prediction result and the second prediction result to obtain a data classification model.

In some embodiments, the second classification model includes a first query encoder and a first key value encoder. The first data is encoded by using the first query encoder to obtain a first encoding result. The first data and data in a first preset dynamic dictionary are encoded by using the first key value encoder to obtain a second encoding result. The second classification model is trained by using a difference between the first encoding result and the second encoding result to obtain the data classification model.

In some embodiments, the pseudo-label supervision method and the comparison and determination method are combined to determine a mixed distillation loss. In the pseudo-label supervision method, the model parameter of the second classification model is adjusted based on the difference between the first prediction result and the second prediction result. In the comparison and determination method, the second classification model is trained by using the first query encoder and the first key value encoder. In some embodiments, a strategy of randomly initializing a student model is used. The second classification model is $F'=f'_c(f'_q)$. $f'_c$ is correspondingly the first query encoder and has a model parameter $\theta'_q$. $f'_c$ is correspondingly the classification regression network and has a model parameter $\theta'_c$. A mixed loss $L_{dis}$ is determined. A calculation formula is shown in the following Formula 1.

$$L_{dis}=L_{con}(x;\theta'_q,\theta'_k)+L_{cls}(y,F'(x;\theta'_q,\theta'_c)),\quad\text{Formula 1:}$$

where x is the first data in the first data set, $\theta'_k$ is a parameter of the first key value encoder $f'_k$. As the momentum update of $\theta'_q$, the first key value encoder $f'_k$ corresponds to the first preset dynamic dictionary. The first encoding result extracted by the first query encoder $f'_q$ is compared with a second encoding result of encoding data in the first preset dynamic dictionary by the first key value encoder to obtain a loss $L_{con}$ in the comparison and determination method. y represents the first prediction result obtained through recognition by the first classification model. The first prediction result is compared with the second prediction result of the second classification model to obtain a loss Las corresponding to a pseudo-label supervision method. The two losses are added to update the model parameter $\theta'_q$.

In some embodiments, different from the reference model, $f'_c$ is implemented by using a fully connected layer (followed by a softmax operation) to facilitate end-to-end model training.

During training, due to a relatively small data amount in the second data set corresponding to rare diseases and noise and a deviation generated from the second data set, the first prediction result generated by the first classification model is not completely usable and may adversely affect the training of the second classification model. Therefore, in the embodiments of the present disclosure, the first prediction result further corresponds to a confidence level parameter, and the confidence level parameter of the first prediction result is obtained. A difference between the first prediction result under the confidence level parameter and the second prediction result is determined, and the model parameter of the second classification model is adjusted based on the difference to obtain the data classification model.

Schematically, in this embodiment, a combination of a predicted value p' of the second classification model and a pseudo-label y (that is, the foregoing first prediction result y) is used as a training target. Reference may be made to the following Formula 2.

$$y^{adpt} = (1-\alpha) \times y + \alpha \times p',  \quad \text{Formula 2:}$$

where $\alpha$ is the confidence level parameter and controls a proportion of a training target that the pseudo-label y generated by the first classification model accounts for. $\alpha$ is usually a fixed value. However, in an initial phase of training, a predicted value generated by a student model has a relatively low confidence level. Therefore, a linear growth method is used in the present disclosure, and $\alpha$ in a $t^{th}$ training round is: $\alpha_t = \alpha_T \times (t/T)$. $\alpha_T$ is a confidence level parameter value of the last training round. Schematically, $\alpha_T$ is set to 0.7. T is a total quantity of training rounds. Finally, $y^{adpt}$ is used to replace y in the foregoing Formula 1 for use as the final loss function.

Step 406: Perform class prediction on target data by using the data classification model to obtain a classification result of the target data in a target class set.

The data classification model is obtained after the second classification model is trained, and target data is classified by using the data classification model to obtain a classification result of the target data in the target class set.

In some embodiments, a test data set is obtained, test data in the test data set being used for testing a training effect of the data classification model; the target data is obtained from the test data set, the target data being labeled with reference classification information; and after class prediction is performed on the target data by using the data classification model to obtain the classification result, training effect data of the data classification model is obtained based on the reference classification information and the classification result. Schematically, a plurality of pieces of target data in the test data set are obtained for respective class prediction, and comparison is made with the reference classification information. A training effect is determined according to a proportion of target data with a correct comparison result in all target data under test. That is, the prediction accuracy of the data classification model is determined.

In summary, in the data classification and recognition method provided in this embodiment, a first classification model is obtained after unsupervised training using unlabeled first data and supervised training of labeled second data, so that a second classification model is created based on the first classification model to perform knowledge distillation training, and supervised training is performed by using a teacher model to implement distillation, to eventually obtain a student model with higher performance and precision. The training mainly depends on a large amount of first data and requires a small amount of labeled second data, to avoid a complex process of massive labeling of sample data, thereby improving the training efficiency and accuracy of a data classification model.

In the method provided in this embodiment, the pseudo-label supervision method and the comparison and determination method are combined to determine a mixed distillation loss. While distillation training is performed on the second classification model by using the first classification model, feature extraction of data by the second classification model is prevented from being affected by the process of distillation training, thereby improving the training efficiency and accuracy of the second classification model.

In the method provided in this embodiment, during the determination of a loss value, due to a relatively small data amount in the second data set and noise and a deviation generated from the second data set, the first prediction result of the first classification model has a certain deviation. Therefore, a confidence level parameter of the first prediction result is introduced, to prevent a deviation in accuracy of the first prediction result from affecting the training effect of the second classification model, thereby improving the prediction accuracy of the classification model.

In the method provided in this embodiment, a linear growth method is introduced for a confidence level parameter to gradually adjust the adjustment effect of the first prediction result by the confidence level parameter, to prevent the confidence level parameter from causing excessively high or excessively low interference with the first prediction result due to manual objective setting, thereby improving the calculation accuracy of a loss value.

Figure 5:
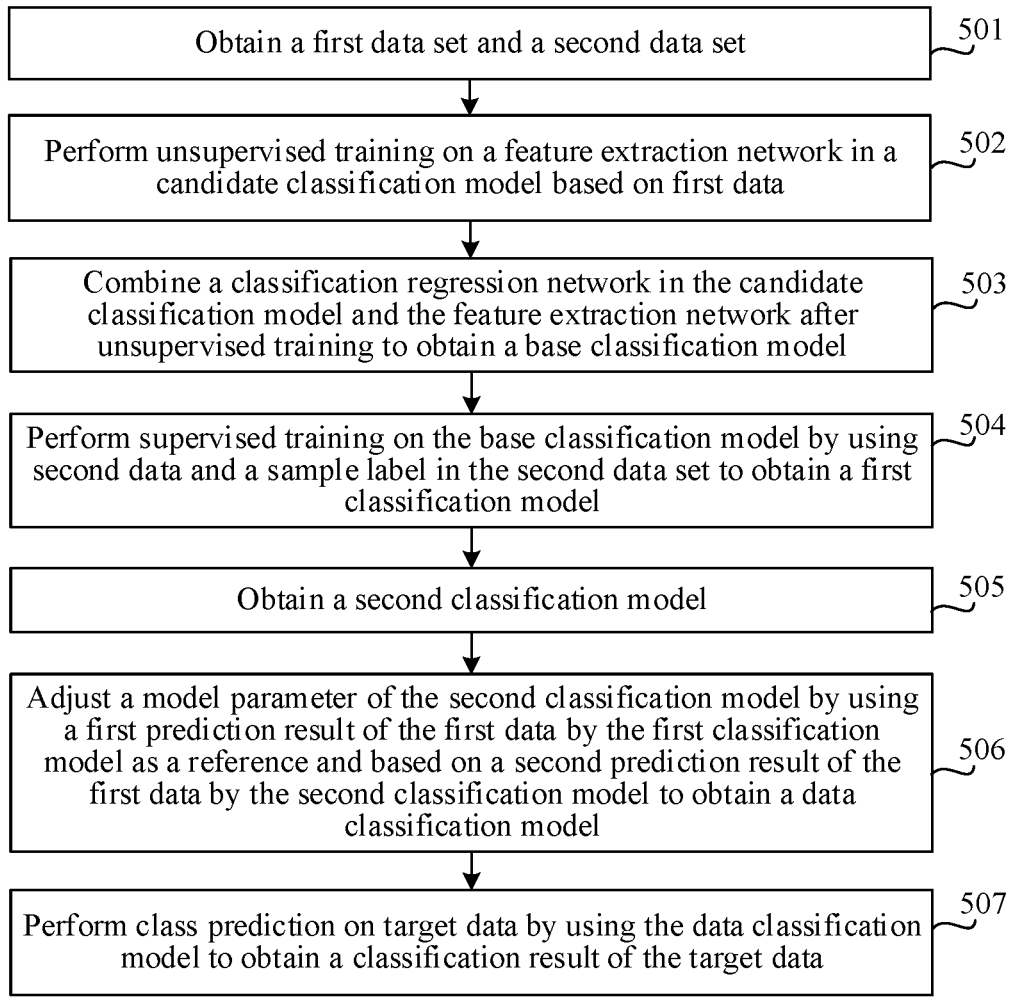
FIG. 5 shows a data classification and recognition method according to another exemplary embodiment of the present disclosure.

In some embodiments, the first classification model is obtained through unsupervised training of first data and supervised training of second data. FIG. 5 is a flowchart of a data classification and recognition method according to another exemplary embodiment of the present disclosure. As shown in FIG. 5, an example in which the method is applied to a server is used. The method includes the following steps:

Step 501: Obtain a first data set and a second data set.

The first data set includes first data. The second data set includes second data labeled with a sample label. The second data belongs to a target class set.

In some embodiments, the first data belongs to a first class set, and the second data belongs to a target class set. That is, the first data and the second data are data that corresponds to different class sets.

Step 502: Perform unsupervised training on a feature extraction network in a candidate classification model based on first data.

In some embodiments, the feature extraction network includes a second query encoder and a second key value encoder. The first data is encoded by using the second query encoder to obtain a third encoding result. A fourth encoding result of encoding data in a second preset dynamic dictionary by using the second key value encoder is obtained. Unsupervised training is performed on the feature extraction network by using a difference between the third encoding result and the fourth encoding result.

Unsupervised representation learning can train a quality feature extraction model without labeled data. Therefore, in the embodiments of the present disclosure, a comparison loss is used as an optimization function of the feature extraction network.

In some embodiments, during feature extraction of the first data by using the feature extraction network, data enhancement is performed on the first data. For example, the first data is medical images. Image enhancement is performed on the medical images in the first data set. The image enhancement includes at least one of enhancement modes such as contrast enhancement, brightness enhancement, and sharpness enhancement. The image enhancement is performed twice for respective inputs into the second query encoder and the second key value encoder. The performing image enhancement twice is performing enhancement twice to different degrees in the same enhancement direction. Alternatively, the performing image enhancement twice is performing enhancement twice to the same degree or different degrees in different enhancement directions. Alternatively, the performing image enhancement twice is performing superimposed enhancement twice to the same degree or different degrees in the same enhancement direction. Schematically, image enhancement is performed twice on each image in the first data set to obtain $x_i^q$ and $x_i^k$. $x_i^q$ is an image obtained after the first time of image enhancement. $x_i^k$ is an image obtained after the second time of image enhancement. Feature extraction is respectively performed by using the second query encoder $q_i=f_q(x_i^q;\theta_q)$ and the second key value encoder $k_i=f_k(x_i^k;\theta_k)$ to obtain corresponding features, where $f_q$ and $f_k$ are respectively the second query encoder and the second key value encoder formed by the parameters $\theta_q$ and $\theta_k$. For a calculation mode of the comparison loss, reference may be made to the following Formula 3.

$$L_{con}(x_i) = -\log\left[\exp(q_i \times k_i/\tau) \Big/ \left(\exp(q_i \times k_i/\tau) + \sum_{j=1}^{l} \exp(q_i \times k_i/\tau)\right)\right],$$

Formula 3 where $x_i$ is the first data in the first data set, l is a quantity of key value images in the second preset dynamic dictionary, and $\tau$ is a hyperparameter for smoothing a label. Through the training of the comparison loss, the model can distinguish between an image $x_i$ and a key value image stored in the second preset dynamic dictionary, the parameter $\theta_q$ is updated through backpropagation according to a difference between the image $x_i$ and the key value image stored in the second preset dynamic dictionary, and momentum update of $\theta_k$ is performed through $\theta_q$:

$\theta_k \leftarrow m\theta_k+(1-m)\theta_q$, where $m \in [0,1)$.

After the unsupervised training of the feature extraction network using the first data set is completed, the parameter $\theta_q$ is frozen.

Step 503: Combine classification regression network in the candidate classification model and the feature extraction network after unsupervised training to obtain a base classification model.

In some embodiments, the classification regression network is configured to perform data classification in the target class set.

In some embodiments, because the foregoing feature extraction network corresponds to the second query encoder and the second key value encoder, when the classification regression network and the feature extraction network are combined, in the embodiments of the present disclosure, the classification regression network is connected to the second query encoder after unsupervised training to obtain the base classification model.

Step 504: Perform supervised training on the base classification model by using second data and a sample label in the second data set to obtain a first classification model.

In some embodiments, when supervised training is performed on the base classification model by using the second data, the second data is inputted into the base classification model to perform class prediction to obtain a prediction result. The second data is labeled with a sample label used for indicating an actual class of the second data, so that a model parameter of the base classification model is reversely adjusted according to the difference between the sample label and the prediction result to obtain the first classification model.

In some embodiments, the loss value of the prediction result is calculated according to the sample label and the prediction result, so that the model parameter of the base classification model is reversely adjusted according to the loss value, until the loss value corresponding to the prediction result converges. For example, the loss value corresponding to the prediction result is less than a preset threshold. Alternatively, a difference between a loss value of a prediction result in a $q^{th}$ time of iterative training and a loss value of a prediction result in a $(q-1)^{th}$ time of iterative training is less than a preset difference threshold, where q is an integer greater than 1.

Step 505: Obtain a second classification model.

The second classification model is a classification model with a model parameter to be adjusted.

In some embodiments, the second classification model is a randomly initialized classification model. The second classification model includes a model parameter. During random initialization, an initial model parameter of the second classification model is randomly obtained. The second classification model is configured to perform distillation training according to knowledge outputted by the first classification model. Knowledge distillation refers to a distillation process in which supervision information outputted by the first classification model, that is, a first prediction result outputted by the first classification model, is used as knowledge and the second classification model learns the supervision information transferred from the first classification model. Supervised training is performed by using the first classification model to implement distillation, to eventually obtain a student model with higher performance and precision.

Step 506: Adjust a model parameter of the second classification model by using a first prediction result of the first data by the first classification model as a reference and based on a second prediction result of the first data by the second classification model to obtain a data classification model.

In some embodiments, class prediction is performed on the first data in the first data set by using the first classification model to obtain the first prediction result of the class corresponding to the first data in the target class set. Class prediction is performed on the first data in the first data set by using the second classification model to obtain the second prediction result corresponding to the first data. A model parameter of the second classification model is adjusted based on a difference between the first prediction result and the second prediction result to obtain a data classification model.

That is, a pseudo-label outputted after the first classification model performs class prediction on the first data is used as knowledge, and the second classification model transfers the pseudo-label for distillation, thereby implementing distillation training of the second classification model.

Step 507: Perform class prediction on target data by using the data classification model to obtain a classification result of the target data.

The data classification model is obtained after the second classification model is trained, and target data is classified by using the data classification model to obtain a classification result of the target data in the target class set. The target data may be data during actual application, for example, medical images during actual application. Alternatively, the target data may be data that is in a test set and is used for testing the data classification model.

In summary, in the data classification and recognition method provided in this embodiment, a first classification model is obtained after unsupervised training using unlabeled first data and supervised training of labeled second data, so that a second classification model is created based on the first classification model to perform knowledge distillation training, and supervised training is performed by using a teacher model to implement distillation, to eventually obtain a student model with higher performance and precision. The training mainly depends on a large amount of first data and requires a small amount of labeled second data, to avoid a complex process of massive labeling of sample data, thereby improving the training efficiency and accuracy of a data classification model.

In the method provided in this embodiment, unsupervised training is performed on the feature extraction network by using the unlabeled first data in the first data set, so that supervised training is performed on the classification model by using the labeled second data in the second data set, so that when the acquisition process of the second data is complex or the acquisition difficulty of the second data is high, it is only necessary to acquire a few second data to implement effective training of the first classification model, thereby improving the training efficiency of the model.

In the method provided in this embodiment, after the data classification model is obtained through training, the training effect of the data classification model is determined by testing the data classification model using the test data in the test data set, to assist in further training or application of the data classification model, thereby improving the classification accuracy of the data classification model.

Figure 6:
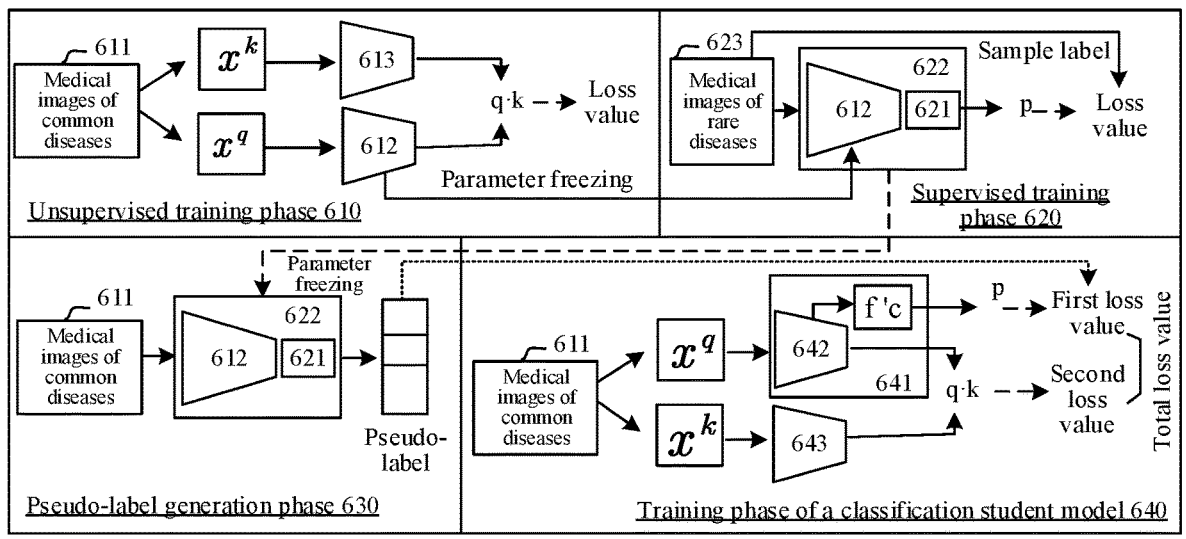
FIG. 6 is an overall schematic diagram of a training process of a rare disease classification and recognition model according to an exemplary embodiment of the present disclosure.

With reference to the foregoing content, an example in which the first data in the foregoing first data set is medical images of common diseases and the second data in the second data set is medical images of rare diseases is used for exemplary description. FIG. 6 is an overall schematic diagram of a training process of a rare disease classification and recognition model according to an exemplary embodiment of the present disclosure.

As shown in FIG. 6, the process includes an unsupervised training phase 610, a supervised training phase 620, a pseudo-label generation phase 630, and a training phase 640 of a second classification model.

In the unsupervised training phase 610, image enhancement is performed twice on unlabeled medical images 611 of common diseases to obtain $x^q$ and $x^k$, and a loss value is determined by using a query encoder 612 and a key value encoder 613, to complete the training of the query encoder 612. A parameter of the query encoder 612 is frozen, and the query encoder 612 after unsupervised training is applied to a connection to a classification regression model 621 in the supervised training phase 620.

In the supervised training phase 620, a first classification model 622 to be trained is obtained after the query encoder 612 is connected to the classification regression model 621. During supervised training of the first classification model 622 by using medical images 623 of rare diseases labeled with a sample label. A loss value is determined according to a sample label correspondingly labeled in the medical images 623 of rare diseases and a classification result of the first classification model 622, and supervised training of the first classification model 622 is implemented.

After the training of the first classification model 622 is completed, in the pseudo-label generation phase 630, classification and recognition are performed on the medical images 611 of common diseases by using the first classification model 622 to obtain a pseudo-label corresponding to the medical images 611 of common diseases.

In the training phase 640 of the second classification model, a first loss value is obtained according to the pseudo-label corresponding to the medical images 611 of common diseases and a prediction result of the second classification model 641, and a second loss value is obtained according to encoding results of a query encoder 642 and a key value encoder 643 in the second classification model 641, so that a total loss value is determined according to the first loss value and the second loss value to train the second classification model 641, to obtain a rare disease classification and recognition model.

Table 1 shows comparison of results in a skin affection class data set in the technical solution of the present disclosure. The data set includes seven classes. Data sets of four classes with the most cases are used as a first data set, and the data sets of the three remaining classes are used as a second data set. Accuracy and an indicator F1 score used for measuring the precision of a binary classification model in statistics are selected as evaluation indicators.

TABLE 1

| Method | (N, K) = (3, 1) | | (N, K) = (3, 3) | | (N, K) = (3, 5) | |
|---|---|---|---|---|---|---|
| | Accuracy (%) | F1 score (%) | Accuracy (%) | F1 score (%) | Accuracy (%) | F1 score (%) |
| Meta learning process-based difficulty-perceivable rare disease diagnosis method | 47.49 | 42.33 | 55.55 | 49.19 | 58.94 | 53.51 |
| Unsupervised meta learning small sample classification method | 42.67 | 39.24 | 45.00 | 39.69 | 47.95 | 44.08 |
| Supervised representation learning and self-distillation small sample classification method | 61.90 | 56.30 | 74.92 | 69.50 | 79.01 | 74.47 |
| Solution in this embodiment | 64.15 | 61.01 | 75.82 | 73.34 | 81.16 | 77.35 |

In Table 1, N represents a quantity of test classes, and K represents a quantity of labeled images provided for each test class. In this technical solution, results of K being 1, 3, and 5 are respectively compared. Remaining images in the rare disease data set form Q as a test set for performance evaluation.

As can be seen from Table 1, the classification indicators in this technical solution are better than those in all related technologies. Self-distillation is added based on a reference model in this technical solution, the accuracy is increased by approximately 1% to 2%, and F1 score is increased by approximately 3% to 5%. It can be observed from Table 1 that when K=5, the accuracy can reach 81.16% without labeling of any common disease data set in this technical solution. The result verifies the assumption of this method that the representation of rare disease data and a classifier thereof can be better learned by injecting pseudo-label supervision information into a process of representation learning and fully utilizing learning of massive unlabeled data sets.

Figure 7:
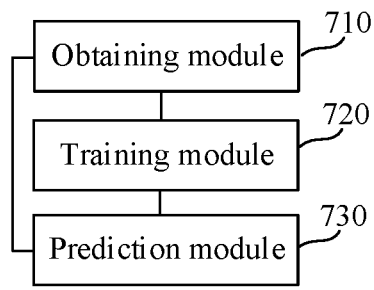
FIG. 7 is a structural block diagram of a data classification and recognition apparatus according to an exemplary embodiment of the present disclosure.

FIG. 7 is a schematic structural diagram of a data classification and recognition apparatus according to an exemplary embodiment of the present disclosure. As shown in FIG. 7, the apparatus includes the following parts:

an obtaining module 710, configured to obtain a first data set and a second data set, the first data set including first data, the second data set including second data labeled with a sample label;

a training module 720, configured to train a candidate classification model using the first data in an unsupervised training mode and using the second data in a supervised training mode to obtain a first classification model, the obtaining module 710 being further configured to obtain a second classification model, the second classification model being a classification model with a model parameter to be adjusted, the training module 720 being further configured to adjust the model parameter of the second classification model by using a first prediction result of the first data by the first classification model as a reference and based on a second prediction result of the first data by the second classification model to obtain a data classification model; and a prediction module 730, configured to perform class prediction on target data by using the data classification model to obtain a classification result of the target data.

In one embodiment, the prediction module 730 is further configured to perform class prediction on the first data by using the first classification model to obtain the first prediction result; and the prediction module 730 is further configured to perform class prediction on the first data by using the second classification model to obtain the second prediction result.

Figure 8:
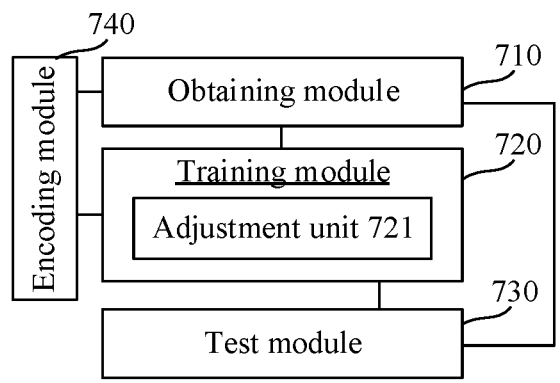
FIG. 8 is a structural block diagram of a data classification and recognition apparatus according to another exemplary embodiment of the present disclosure.

As shown in FIG. 8, the training module 720 further includes:

an adjustment module 721, configured to adjust the model parameter of the second classification model based on a difference between the first prediction result and the second prediction result.

In one embodiment, the obtaining module 710 is further configured to obtain a confidence level parameter of the first prediction result; and the adjustment unit 721 is further configured to: determine a difference between the first prediction result under the confidence level parameter and the second prediction result, and adjust the model parameter of the second classification model based on the difference.

In one embodiment, the prediction module 730 is further configured to perform class prediction on the first data by using the first classification model to obtain a probability value that the first data corresponds to a class in a target class set; and determine the first prediction result from the target class set based on the probability value.

In one embodiment, the second classification model includes a first query encoder and a first key value encoder; and the apparatus further includes:

an encoding module 740, configured to encode the first data by using the first query encoder to obtain a first encoding result;

the obtaining module 710 being further configured to obtain a second encoding result of encoding the first data and data in a first preset dynamic dictionary by using the first key value encoder; and the training module 720 being further configured to train the second classification model by using a difference between the first encoding result and the second encoding result.

In one embodiment, the training module 720 is further configured to: perform unsupervised training on a feature extraction network in a candidate classification model based on first data; and combine a classification regression network in the candidate classification model and the feature extraction network after unsupervised training to obtain a base classification model, the classification regression network being configured to perform data classification in the target class set; and the training module 720 being further configured to perform supervised training on the base classification model by using the second data and the sample label in the second data set to obtain the first classification model.

In one embodiment, the feature extraction network includes a second query encoder and a second key value encoder; and the apparatus further includes:

an encoding module 740, configured to encode the first data by using the second query encoder to obtain a third encoding result;

the obtaining module 710 being further configured to obtain a fourth encoding result of encoding the first data and data in a second preset dynamic dictionary by using the second key value encoder; and the training module 720 being further configured to perform unsupervised training on the feature extraction network by using a difference between the third encoding result and the fourth encoding result.

In one embodiment, the training module 720 is further configured to: connect the classification regression network to the second query encoder after unsupervised training to obtain the base classification model.

In one embodiment, the obtaining module 710 is further configured to: obtain a test data set, test data in the test data set being used for testing a training effect of the data classification model; and obtain the target data from the test data set, the target data being labeled with reference classification information;

the prediction module 730 being further configured to perform class prediction on target data by using the data classification model to obtain a classification result; and the obtaining module 710 being further configured to obtain training effect data of the data classification model based on the reference classification information and the classification result.

In summary, in the data classification and recognition apparatus provided in this embodiment, a first classification model is obtained after unsupervised training using unlabeled first data and supervised training of labeled second data, so that a second classification model is created based on the first classification model to perform knowledge distillation training, and supervised training is performed by using a teacher model to implement distillation, to eventually obtain a student model with higher performance and precision. The training mainly depends on a large amount of first data and requires a small amount of labeled second data, to avoid a complex process of massive labeling of sample data, thereby improving the training efficiency and accuracy of a data classification model.

The data classification and recognition apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the data classification and recognition apparatus provided in the foregoing embodiment is based on the same concept as the embodiments of the data classification and recognition method. For a specific implementation process, refer to the method embodiments, and details are not described herein again.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 9:
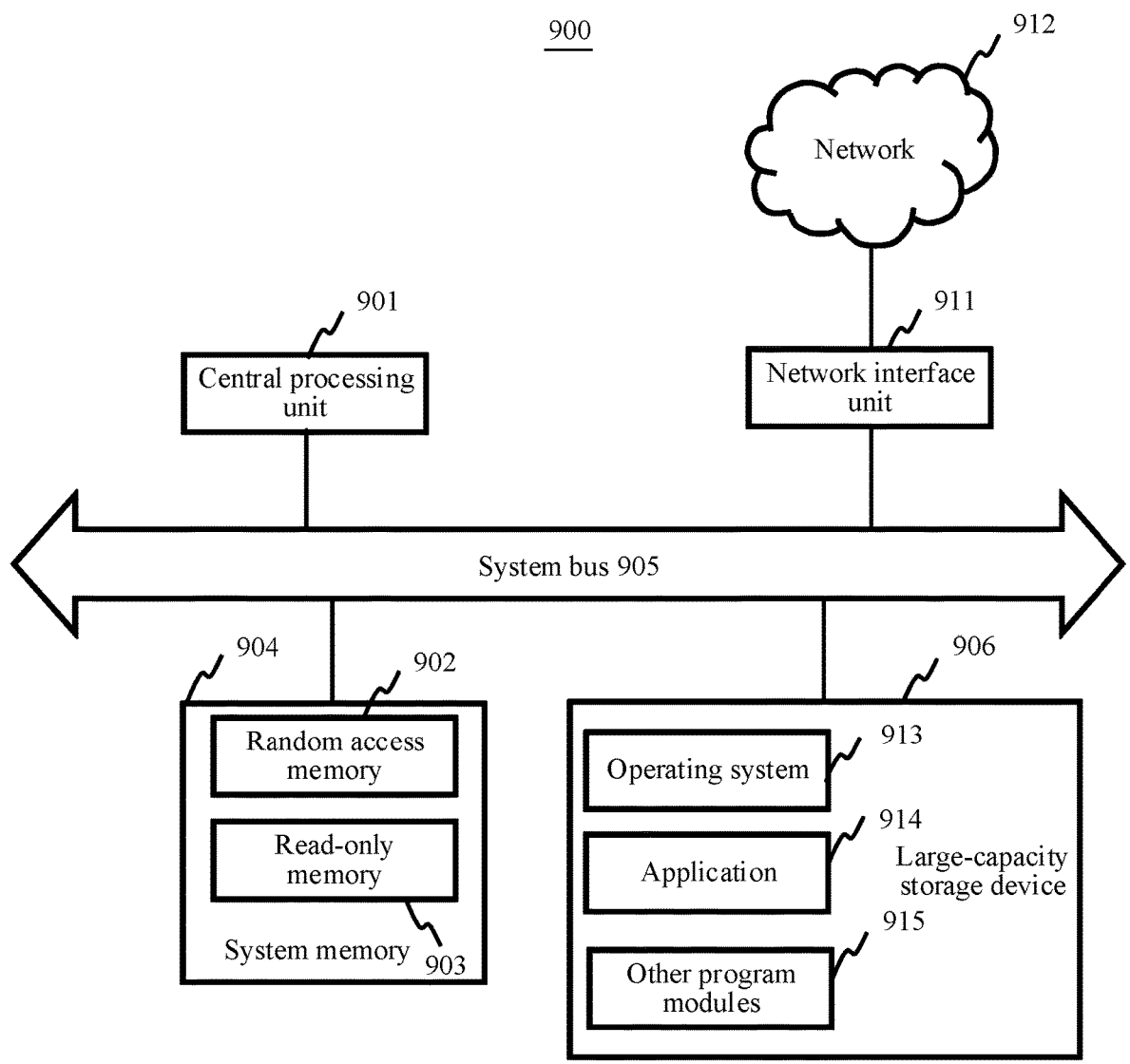
FIG. 9 is a structural block diagram of a server according to an exemplary embodiment of the present disclosure.

FIG. 9 is a schematic structural diagram of a server according to an exemplary embodiment of the present disclosure.

Specifically, the server 900 includes a central processing unit (CPU) 901, a system memory 904 including a random access memory (RAM) 902 and a read memory (ROM) 903, and a system bus 905 connecting the system memory 904 to the CPU 901. The server 900 further includes a mass storage device 906 configured to store an operating system 913, an application program 914, and another program module 915.

The mass storage device 906 is connected to the central processing unit 901 through a mass storage controller (not shown) connected to the system bus 905. The mass storage device 906 and a computer readable medium associated with the mass storage device provide non-volatile storage for the server 900. That is, the mass storage device 906 may include a computer-readable medium (not shown) such as a hard disk or a compact disc read only memory (CD-ROM) drive.

In general, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, those skilled in the art may learn that the computer storage medium is not limited to the above. The foregoing system memory 904 and mass storage device 906 may be collectively referred to as a memory.

According to various embodiments of the present disclosure, the server 900 may further be connected, by using a network such as the Internet, to a remote computer on the network and run. That is, the server 900 may be connected to a network 912 by using a network interface unit 911 that is connected to the system bus 905, or may be connected to a network of another type or a remote computer system (not shown) by using the network interface unit 911.

The memory further includes one or more programs, which are stored in the memory and are configured to be executed by the CPU.

The embodiments of the present disclosure further provide a computer device, including a processor and a memory, the memory storing at least one instruction, at least one program, a code set, or an instruction set, the at least one instruction, the at least one program, the code set, or the instruction set being loaded and executed by the processor to implement the data classification and recognition method provided in the foregoing method embodiments.

The embodiments of the present disclosure further provide a computer-readable storage medium, storing at least one instruction, at least one program, a code set or an instruction set, and the at least one instruction, the at least one program, the code set or the instruction set being loaded and executed by a processor to implement the data classification and recognition method provided in the foregoing method embodiments.

In some embodiments, the computer-readable storage medium may include a read-only memory (ROM), a random access memory (RAM), a solid state drive (SSD), an optical disc, or the like. The RAM may include a resistive RAM (ReRAM) and a dynamic RAM (DRAM). The sequence numbers of the foregoing embodiments of the present disclosure are merely for description purpose, and do not indicate the preference among the embodiments.

The embodiments of the present disclosure further provide a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform any data classification and recognition method in the foregoing embodiments.

What is claimed is:

1. A data classification and recognition method, applied to a computer device, the method comprising:
obtaining a first data set and a second data set, the first data set comprising first data, the first data being unlabeled data, the second data set comprising second data, wherein a sample in the second data is labeled, a data amount of the first data in the first data set is greater than a data amount of the second data in the second data set;

performing unsupervised training on a feature extraction network in a candidate classification model based on the first data;

combining a classification regression network in the candidate classification model and the feature extraction network after the unsupervised training to obtain a base classification model, the classification regression network being configured to perform data classification in a target class set;

performing supervised training on the base classification model by using the second data and corresponding sample labels of the second data set to obtain a first classification model;

obtaining a second classification model, the second classification model being a classification model with a model parameter to be adjusted;

adjusting the model parameter of the second classification model by using a first prediction result of the first data predicted by the first classification model as a reference and based on a second prediction result of the first data predicted by the second classification model, to obtain a data classification model, the first prediction result being utilized as a pseudo-label; and performing class prediction on target data by using the data classification model to obtain a classification result of the target data.

2. The method according to claim 1, wherein the adjusting the model parameter of the second classification model by using the first prediction result of the first data predicted by the first classification model as a reference and based on the second prediction result of the first data predicted by the second classification model comprises:

performing class prediction on the first data by using the first classification model to obtain the first prediction result;

performing class prediction on the first data by using the second classification model to obtain the second prediction result; and adjusting the model parameter of the second classification model based on a difference between the first prediction result and the second prediction result.

3. The method according to claim 2, wherein the adjusting the model parameter of the second classification model based on the difference between the first prediction result and the second prediction result comprises:

obtaining a confidence level parameter of the first prediction result; and determining a difference between the first prediction result under the confidence level parameter and the second prediction result, and adjusting the model parameter of the second classification model based on the difference.

4. The method according to claim 2, wherein the performing class prediction on the first data by using the first classification model to obtain the first prediction result comprises:

performing class prediction on the first data by using the first classification model to obtain a probability value that the first data corresponds to a class in the target class set; and determining the first prediction result from the target class set based on the probability value.

5. The method according to claim 2, wherein the second classification model comprises a first query encoder and a first key value encoder; and the method further comprises:

encoding the first data by using the first query encoder to obtain a first encoding result;

obtaining a second encoding result of encoding the first data and data in a first preset dynamic dictionary by using the first key value encoder; and training the second classification model by using a difference between the first encoding result and the second encoding result.

6. The method according to claim 1, wherein the feature extraction network comprises a second query encoder and a second key value encoder; and the performing unsupervised training on a feature extraction network in the candidate classification model based on the first data comprises:

encoding the first data by using the second query encoder to obtain a third encoding result;

obtaining a fourth encoding result of encoding the first data and data in a second preset dynamic dictionary by using the second key value encoder; and performing unsupervised training on the feature extraction network by using a difference between the third encoding result and the fourth encoding result.

7. The method according to claim 6, wherein the combining the classification regression network in the candidate classification model and the feature extraction network after unsupervised training comprises:

connecting the classification regression network to the second query encoder after unsupervised training to obtain the base classification model.

8. The method according to claim 1, wherein the performing class prediction on target data by using the data classification model to obtain the classification result of the target data comprises:

obtaining a test data set, test data in the test data set being used for testing a training effect of the data classification model;

obtaining the target data from the test data set, the target data being labeled with reference classification information;

performing class prediction on the target data by using the data classification model to obtain the classification result; and obtaining training effect data of the data classification model based on the reference classification information and the classification result.

9. A data classification and recognition apparatus, the apparatus comprising:

a memory; and a processor coupled to the memory and configured to perform:

obtaining a first data set and a second data set, the first data set comprising first data, the first data being unlabeled data, the second data set comprising second data, wherein a sample in the second data is labeled, a data amount of the first data in the first data set is greater than a data amount of the second data in the second data set;

performing unsupervised training on a feature extraction network in a candidate classification model based on the first data;

combining a classification regression network in the candidate classification model and the feature extraction network after the unsupervised training to obtain a base classification model, the classification regression network being configured to perform data classification in a target class set;

performing supervised training on the base classification model by using the second data and corresponding sample labels of the second data set to obtain a first classification model;

obtaining a second classification model, the second classification model being a classification model with a model parameter to be adjusted;

adjusting the model parameter of the second classification model by using a first prediction result of the first data predicted by the first classification model as a reference and based on a second prediction result of the first data predicted by the second classification model, to obtain a data classification model, the first prediction result being utilized as a pseudo-label; and performing class prediction on target data by using the data classification model to obtain a classification result of the target data.

10. The apparatus according to claim 9, wherein the adjusting the model parameter of the second classification model by using the first prediction result of the first data predicted by the first classification model as a reference and based on the second prediction result of the first data predicted by the second classification model comprises:

performing class prediction on the first data by using the first classification model to obtain the first prediction result;

performing class prediction on the first data by using the second classification model to obtain the second prediction result; and adjusting the model parameter of the second classification model based on a difference between the first prediction result and the second prediction result.

11. The apparatus according to claim 10, wherein the adjusting the model parameter of the second classification model based on the difference between the first prediction result and the second prediction result comprises:

obtaining a confidence level parameter of the first prediction result; and determining a difference between the first prediction result under the confidence level parameter and the second prediction result, and adjusting the model parameter of the second classification model based on the difference.

12. The apparatus according to claim 10, wherein the performing class prediction on the first data by using the first classification model to obtain the first prediction result comprises:

performing class prediction on the first data by using the first classification model to obtain a probability value that the first data corresponds to a class in the target class set; and determining the first prediction result from the target class set based on the probability value.

13. The apparatus according to claim 10, wherein the second classification model comprises a first query encoder and a first key value encoder; and the processor is further configured to perform:

encoding the first data by using the first query encoder to obtain a first encoding result;

obtaining a second encoding result of encoding the first data and data in a first preset dynamic dictionary by using the first key value encoder; and training the second classification model by using a difference between the first encoding result and the second encoding result.

14. The apparatus according to claim 9, wherein the feature extraction network comprises a second query encoder and a second key value encoder; and the performing unsupervised training on a feature extraction network in the candidate classification model based on the first data comprises:

encoding the first data by using the second query encoder to obtain a third encoding result;

obtaining a fourth encoding result of encoding the first data and data in a second preset dynamic dictionary by using the second key value encoder; and performing unsupervised training on the feature extraction network by using a difference between the third encoding result and the fourth encoding result.

15. The apparatus according to claim 14, wherein the combining the classification regression network in the candidate classification model and the feature extraction network after unsupervised training comprises:

connecting the classification regression network to the second query encoder after unsupervised training to obtain the base classification model.

16. The apparatus according to claim 9, wherein the performing class prediction on target data by using the data classification model to obtain the classification result of the target data comprises:

obtaining a test data set, test data in the test data set being used for testing a training effect of the data classification model;

obtaining the target data from the test data set, the target data being labeled with reference classification information;

performing class prediction on the target data by using the data classification model to obtain the classification result; and obtaining training effect data of the data classification model based on the reference classification information and the classification result.

17. A non-transitory computer-readable storage medium, storing at least one instruction, at least one program, a code set or an instruction set, and the at least one instruction, the at least one program, the code set or the instruction set being loaded and executed by a processor to implement:

obtaining a first data set and a second data set, the first data set comprising first data, the first data being unlabeled data, the second data set comprising second data, wherein a sample in the second data is labeled, a data amount of the first data in the first data set is greater than a data amount of the second data in the second data set;

performing unsupervised training on a feature extraction network in a candidate classification model based on the first data;

combining a classification regression network in the candidate classification model and the feature extraction network after the unsupervised training to obtain a base classification model, the classification regression network being configured to perform data classification in a target class set;

performing supervised training on the base classification model by using the second data and corresponding sample labels of the second data set to obtain a first classification model;

obtaining a second classification model, the second classification model being a classification model with a model parameter to be adjusted;

adjusting the model parameter of the second classification model by using a first prediction result of the first data predicted by the first classification model as a reference and based on a second prediction result of the first data predicted by the second classification model, to obtain a data classification model, the first prediction result being utilized as a pseudo-label; and performing class prediction on target data by using the data classification model to obtain a classification result of the target data.

18. The non-transitory computer-readable storage medium according to claim 17, wherein the adjusting the model parameter of the second classification model by using the first prediction result of the first data predicted by the first classification model as a reference and based on the second prediction result of the first data predicted by the second classification model comprises:

performing class prediction on the first data by using the first classification model to obtain the first prediction result;

performing class prediction on the first data by using the second classification model to obtain the second prediction result; and adjusting the model parameter of the second classification model based on a difference between the first prediction result and the second prediction result.

* * * * *